（12） United States Patent
Huang

(10) Patent No.: US 9,330,664 B2
(45) Date of Patent: May 3, 2016

(54) CONTROLLER FOR VOICE-CONTROLLED DEVICE AND ASSOCIATED METHOD

(71) Applicant: MStar Semiconductor, Inc., Hsinchu Hsien (TW)

(72) Inventor: Hung-Chi Huang, Taichung (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/450,366

(22) Filed: Aug. 4, 2014

(65) Prior Publication Data

US 2015/0039305 A1 Feb. 5, 2015

(30) Foreign Application Priority Data

Aug. 2, 2013 (TW) ............... 102127843 A

(51) Int. Cl.
*G10L 15/20* (2006.01)
*G10L 15/22* (2006.01)
*G10L 15/10* (2006.01)
*G10L 15/01* (2013.01)

(52) U.S. Cl.
CPC .............. *G10L 15/20* (2013.01); *G10L 15/10* (2013.01); *G10L 15/01* (2013.01)

(58) Field of Classification Search
CPC G01W 1/00; G06Q 30/0219; G06Q 30/0241; G06Q 30/0252; A61L 2202/11

USPC .......... 704/233, E15.039, 246, E17.001, 243, 704/200, 226, 254, E15.005; 381/107, 111, 381/123; 710/15; 340/601, 540; 705/41.21; 455/456.3
See application file for complete search history.

(56) References Cited

U.S. PATENT DOCUMENTS

| 5,991,718 | A | 11/1999 | Malah |
| 6,272,460 | B1 | 8/2001 | Wu et al. |
| 8,138,930 | B1 * | 3/2012 | Heath ............................ 340/601 |
| 8,306,815 | B2 * | 11/2012 | Konig et al. .................. 704/233 |
| 2012/0209609 | A1 | 8/2012 | Zhao et al. |

FOREIGN PATENT DOCUMENTS

TW 200715146 A 4/2007

OTHER PUBLICATIONS

Taiwan Office Action, Jan. 29, 2015, 5 pages.
Taiwan Office Action, Jun. 11, 2015, 6 pages.

* cited by examiner

*Primary Examiner* — Charlotte M Baker
(74) *Attorney, Agent, or Firm* — Edell, Shapiro & Finnan, LLC

(57) ABSTRACT

A controller for a voice-controlled device is provided. The controller includes a setting module and a recognition module. The setting module generates a threshold according to an environmental parameter. The recognition module compares a confident score of speech recognition with the threshold to accordingly execute voice control.

11 Claims, 3 Drawing Sheets

| volume (dB) | threshold Td |
|---|---|
| 80~100 dB | 80 |
| 60~79 dB | 60 |
| 40~59 dB | 40 |
| 20~39 dB | 20 |
| 0~19 dB | 20 |

FIG. 2

| time | threshold Td |
|---|---|
| 08:00~17:00 | 80 |
| 17:00~21:00 | 60 |
| 21:00~08:00 | 40 |

FIG. 3

CONTROLLER FOR VOICE-CONTROLLED DEVICE AND ASSOCIATED METHOD

This application claims the benefit of Taiwan application Serial No. 102127843, filed Aug. 2, 2013, the subject matter of which is incorporated herein by reference.

BACKGROUND OF THE INVENTION

1. Field of the Invention

The invention relates in general to a controller for a voice-controlled device and an associated method, and more particularly to a controller capable of dynamically adjusting a speech recognition threshold according to an environment that a voice-controlled device is disposed in, and an associated method.

2. Description of the Related Art

A voice-controlled device, controlled by a control command issued by a user speech, provides users with a friendly and intuitive human-machine interface (HMI). An increasing number of electronic devices have incorporated the voice control function to become voice-controlled devices, e.g., cell phones, navigators, digital cameras/video cameras, wearable/handheld/portable smart electronic devices (e.g., computers), vehicle electronic systems, and household appliances such as televisions.

To realize the voice control function, a voice-controlled device receives a user speech by a microphone, and performs speech recognition, e.g., comparing the received speech with a plurality of predetermined words/phrases in a database. Among these predetermined words/phrases, when a particular speech has a highest matching level with a particular predetermined word/phrase, and a confidence score derived from the matching level exceeds a threshold, the voice-controlled device recognizes the particular speech as the most matching predetermined word/phrase. When the most matching predetermined word/phrase matches a particular command, the voice-controlled device may then execute the command. Conversely, when the confidence score does not reach the threshold, the voice-controlled device may determine the user speech as invalid (unrecognizable).

SUMMARY OF THE INVENTION

In the present invention, it is acknowledged that an operation environment of a voice-controlled device may affect speech recognition. Therefore, during speech recognition, environmental factors are also considered. It is an object of the present invention to provide a controller (e.g., a controller chip) for a voice-controlled device. The controller includes a setting module and a recognition module. The setting module generates a threshold according to an environmental parameter, which is associated with an environment that the voice-controlled device is disposed in. The recognition module, coupled to the setting module, receives a speech, and performs speech recognition on the speech to generate a confidence score of speech recognition. The recognition module further compares the confidence score of speech recognition with the threshold to generate a control signal to accordingly execute voice control.

For example, the voice-controlled device may be a television having a speaker or sound system, and the environmental parameter may be a volume value of the speaker. For example, when the volume value of the speaker is higher, the setting module may set the threshold to a higher value; when the volume value is lower, the setting module may set the threshold to a lower value. When the threshold of the confidence score of speech recognition is higher, the user speech for voice control needs to be louder and clearer in order to be recognized as a valid voice-control command. When the threshold is lower, the user speech for voice control can be easily recognized as a voice-control command even when it is lower and fainter.

Further, the environmental parameter may include a time value, e.g., a real-time clock (RTC) provided by the voice-controlled device. For example, the setting module may set the threshold to a first value from eight o'clock in the morning to seven o'clock in the evening of the day, and maintain the threshold at a different second value in another period of the day.

Further, the controller may include (or externally connect to) an environment detector. The environment detector detects the environment that the voice-controlled device is disposed in to obtain the environmental parameter. That is, the environmental parameter may also include a quantitative environment detection result provided by the environment detector. For example, the environment detector may be a microphone that detects the background volume to detect the environment volume. Further, the environment detector may be an optical sensor that detects the brightness of the environment (background). In certain application scenarios, a higher background volume and/or brightness indicates that the voice-controlled device is operating in a noisier environment, and so the setting module may increase the threshold to prevent erroneously recognizing the background noise as a voice-control command. Further, a lower background volume and/or brightness indicates that the voice-controlled device is operating in a quieter environment, and so the setting module may lower the threshold to allow the user to perform voice control with a speech at a lower volume. The controller of the present invention may further include a storage unit that stores a look-up table (LUT). The setting module may look up the LUT according to the environmental parameter to generate the threshold.

It is another object of the present invention to provide a method for a voice-controlled device. The method includes: generating a threshold according to an environmental parameter; receiving a speech, and performing speech recognition on the speech to generate a confidence score of speech recognition; and comparing the confidence score of speech recognition with the threshold, and generating a control signal to accordingly perform voice control.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 2 and FIG. 3 are examples of setting a threshold for speech recognition according to an environmental parameter according to an embodiment of the present invention.

DETAILED DESCRIPTION OF THE INVENTION

Figure 1:
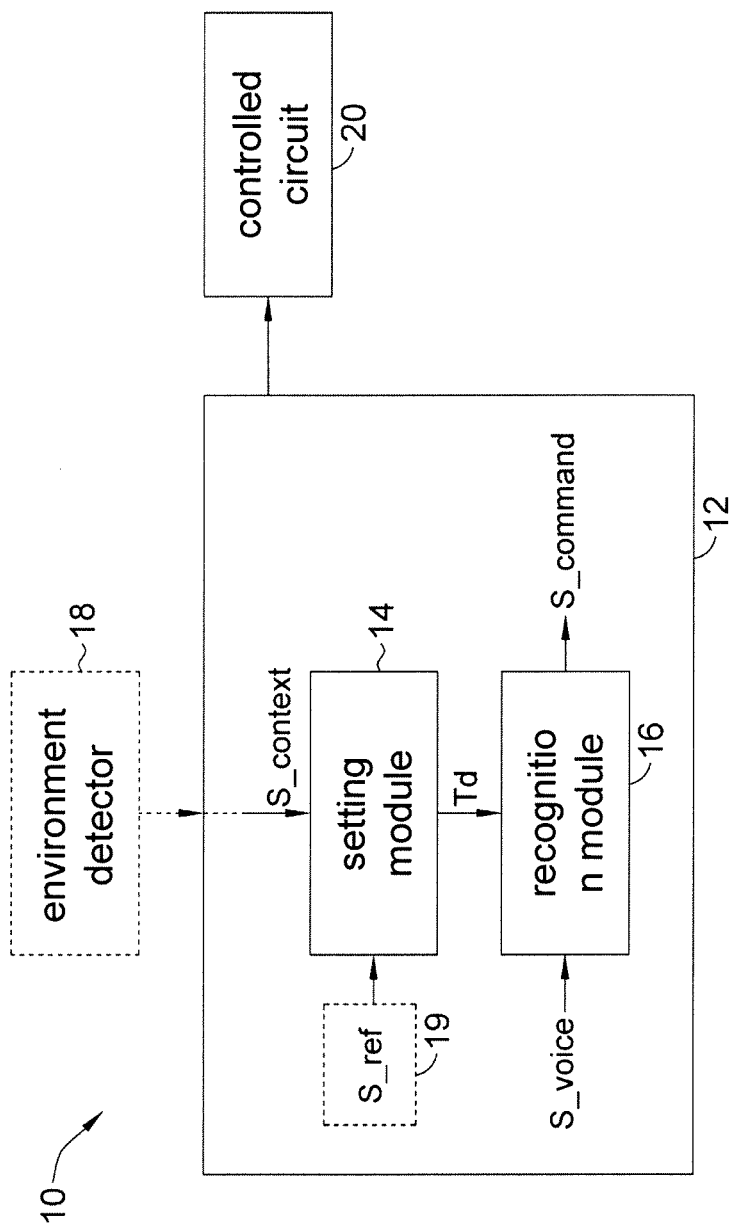
FIG. 1 is a schematic diagram of a voice-controlled device according to an embodiment of the present invention.

FIG. 1 shows a schematic diagram of a voice-controlled device 10 according to an embodiment of the present invention. The voice-controlled device 10 includes a controller 12 and a controlled circuit 20. The controller 12 may be a controller chip and coupled to the controlled circuit 20, and controls the controlled circuit 20. For example, the voice-controlled device 10 may be a television, the controller 12 may be a television controller chip, and the controlled circuit 20 may be a speaker, display panel, frequency tuner and associated driver circuit/chip. The controller 12 may include a setting module 14 and a recognition module 16 to implement a voice control function.

The voice-controlled device 10 is capable of converting a user speech to an electronic signal S_voice, and transmits the electronic signal S_voice to the recognition module 16 in the controller 12. The setting module 14 in the controller 12 is capable of automatically, dynamically and adaptively adjusting a confidence threshold Td of speech recognition according to a signal S_context of an environmental parameter. The recognition module 16, coupled to the setting module 14, receives the speech signal S_voice, and performs speech recognition on the speech signal S_voice to generate a confidence score (not shown) of speech recognition. The recognition module 16 further compares the confidence score with the threshold Td to provide a signal S_command (e.g., a control signal) to accordingly perform voice control. As the confidence score of speech recognition gets higher, it means the accuracy probability of the recognition result is also higher. In general, the confidence score of speech recognition gets higher as the volume gets louder or the pronunciation gets more accurate. For example, when the recognition module 16 learns from comparison that the speech of the signal S_voice has a highest matching level with a particular word/phrase and the confidence score of speech recognition derived from the matching level is higher than the threshold Td, the recognition module 16 may further compare whether the most matching word/phrase matches a predetermined control command. If so, the matching command can be reflected in the signal S_command, and the controller 12 may then execute the command in the signal S_command to accordingly control the controlled circuit 20. For example, when the voice-controlled system 10 is a television, the control command of the speech may include switching the signal source to an assigned channel, to a previous channel and to a next channel, and adjusting the volume.

Further, while the recognition module 16 performs speech recognition on the signal S_voice, when the confidence score of speech recognition is lower than the threshold Td, the recognition module 16 may reflect "no recognition result" in the signal S_command, such that the controller 12 performs an additional process, e.g., continuing receiving a subsequent speech, or prompting the user to re-issue the speech command.

As previously stated, the setting module 14 is capable of automatically adjusting the threshold Td according to the environmental parameter reflected in the signal S_context. In other words, the voice control technology of the present invention further considers the operation environment of the voice-controlled device 10 when recognizing the speech command to improve the adaptivity of speech recognition.

For example, the voice-controlled device 10 may be a television having a speaker or a sound system, and the environmental parameter may be a volume value of the speaker. For example, when the volume value is higher (e.g., when the user increases the volume of the speaker), the setting module 14 may set the threshold Td to a higher value; when the volume value is lower, the setting module 14 may set the threshold Td to a lower value. FIG. 2 shows an example of setting the threshold Td according to a volume value of the present invention. In the example in FIG. 2, when the volume value falls within a range between 80 db and 100 db, the setting module 14 (FIG. 1) sets the threshold Td to 80; when the volume value falls between 60 db and 79 db, the threshold Td is set to 60; when the volume value falls between 40 db and 59 db, the threshold Td is set to 40. When the confidence score threshold Td of speech recognition is higher, the user speech for voice control needs to be louder and clearer in order to be determined as a valid voice control command. When the threshold Td is lower, the user speech for voice control can be easily recognized as a voice-control command even when it is lower and fainter.

Further, the environmental parameter may further include a time value, e.g., a real-time clock (RTC) provided by the voice-controlled device 10.

For example, as shown in the example in FIG. 3, the setting module 14 may set the threshold Td to a first value (e.g., 80 db) from eight o'clock in the morning to five o'clock in the afternoon, set the threshold Td to a different second value (e.g., 60 db) from five o'clock in the afternoon to nine o'clock in the evening, and maintain the threshold Td at a third value (e.g., 40 db) in the remaining period.

Further, as shown in FIG. 1, the voice-controlled device 10 may be coupled to one (or multiple) environment detector 18. The environment detector 18 detects a particular characteristic (or particular characteristics) of the environment, and provides a quantitative environment detection result. The environment detector 18 may be built in the voice-controlled device 10, or may be an independent external device coupled to the controller 12 in the voice-controlled device 10. The environmental detection result of the environment detector 18 may be included in the signal S_context, so that the setting module 14 may further set the threshold Td according to the environmental detection result.

For example, the environment detector 18 may be a microphone that detects the background volume. Further, the environment detector 18 may be an optical sensor that detects the background brightness. In certain application scenarios, a higher background volume and/or brightness indicates that the voice-controlled device is operating in a noisier environment, and so the setting module 14 may increase the threshold Td to prevent erroneously recognizing the background noise as a voice-control command. Further, a lower background volume and/or brightness indicates that the voice-controlled device 10 is operating in a quieter environment, and so the setting module 14 may lower the threshold Td to allow the user to perform voice control with a speech at a lower volume.

Further, the environment detector 18 may be a position-detecting positioning device, e.g., a satellite positioning device or a wireless positioning device, which detects the position of the voice-controlled device 10 and allows the setting module 14 to accordingly set the threshold Td according to the positioning result. The environment detector 18 may further be an image capturing and recognizing device capable of recognizing a user identity of the voice-controlled device 10, such that the setting module 14 may individually set corresponding threshold Td for different users. Further, the environment detector 18 may recognize the number of users, and set the threshold Td according to the number of users. For example, the threshold Td is increased for a larger number of users.

Further, the environment detector 18 may be a distance detecting device for detecting a distance from the user to the voice-controlled device 10, and utilize the user distance as an environmental parameter, such that the setting module 14 may adjust the threshold Td according to the user distance. For example, the threshold Td is lowered when the user distance is large. The environment detector 18 may further be a temperature sensor that utilizes a sensed temperature as an environmental parameter.

The setting module 14 may set the threshold Td according to one or multiple environmental parameters. The one or multiple environmental parameters may include operation parameters (e.g., the volume of the speaker or the time value) of the voice-controlled device 10, and/or a detection result (detection results) of one or multiple environment detectors. For example, the setting module 14 may integrate multiple environmental parameters according to a predetermined algorithm (e.g., OR or AND logic computations), and set the threshold Td according to the integration result. For example, when a first environmental parameter falls within a first value range and a second environmental parameter falls within a second value range, the setting module 14 sets the threshold Td to a first value; when the first environmental parameter exceeds the first value range or the second environmental parameter exceeds the second value range, the setting module 14 changes the threshold Td to a second value. In another embodiment, when the first environmental parameter falls within a first value range, the setting module 14 causes the threshold Td to change with the second environmental parameter; when the first environmental parameter exceeds the first value range, the setting module 14 keeps the threshold Td unchanged.

Figure 4:
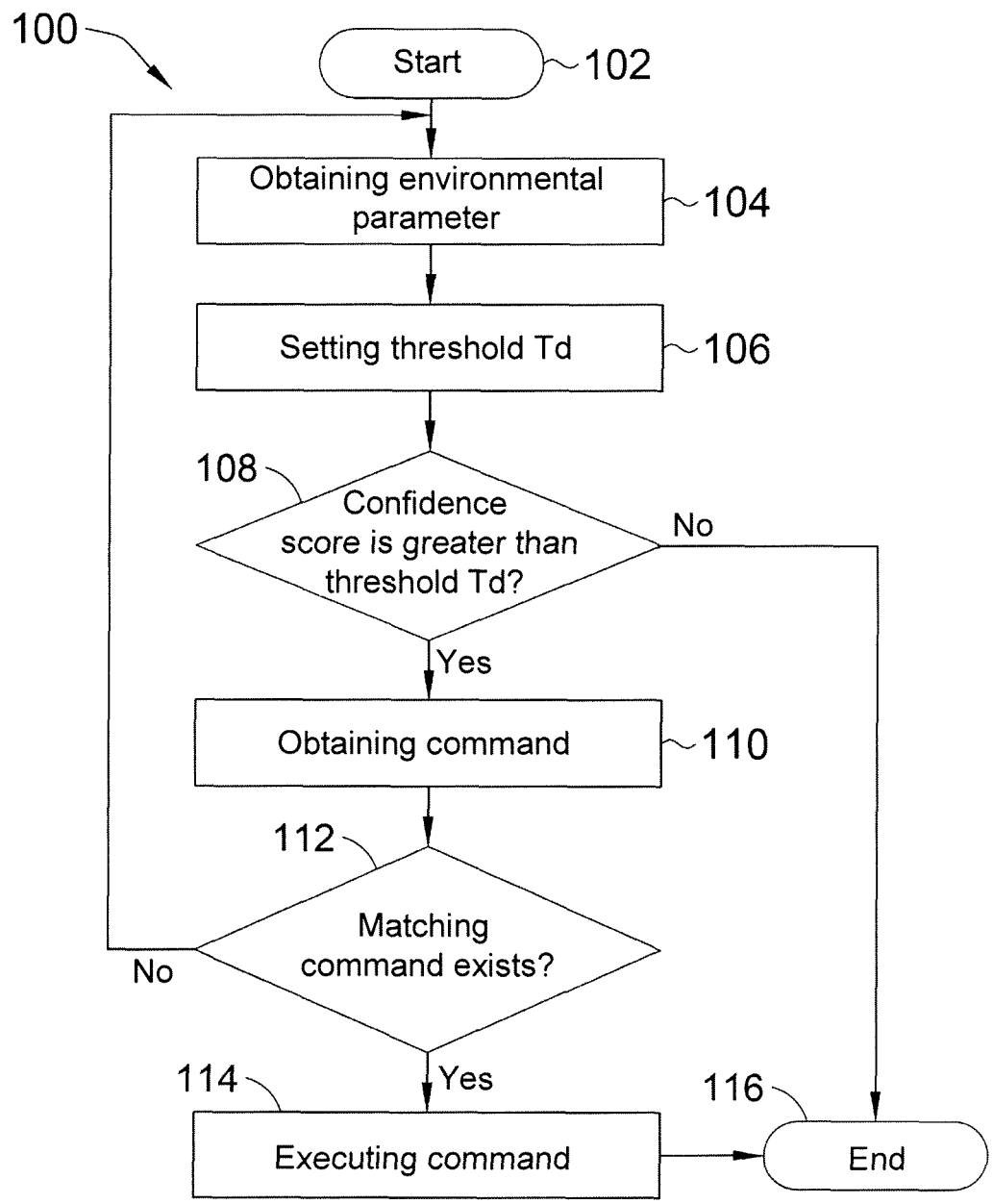
FIG. 4 is a flowchart of a method according to an embodiment of the present invention.

In continuation of the embodiment in FIG. 1, FIG. 4 shows a flowchart of a process 100 according to an embodiment of the present invention. The controller 12 in FIG. 1 may implement voice control according to the process 100. The process 100 includes the following steps.

In step 102, the process 100 begins. The controller 12 may start the process 100 after a speech is received.

In step 104, an environmental parameter/multiple environmental parameters is/are received. The (one or multiple) environmental parameter(s) may include an operation parameter of the voice-controlled device 10, and/or an environmental parameter (environmental parameters) of one or multiple environmental parameters.

In step 106, a confidence threshold Td of speech recognition is set according to the (one or multiple) environmental parameter(s).

In step 108, a most matching word/phrase to the speech in step 102 is identified, a confidence score is calculated according to the matching level, and it is compared whether the confidence threshold is larger than the threshold Td. The process 100 proceeds to step 110 if so, or else step 116 is performed.

In step 110, when this step is performed, it means that contents of the speech are effectively represented by the most matching word/phrase, and step 112 is performed to obtain a command for voice control.

In step 112, from a plurality of commands, it is compared whether the most matching word/phrase matches one of these commands. Step 114 is performed if so, or else the process 100 returns to step 104.

In step 114, the controller 12 executes the matching command identified in step 112 to achieve voice control.

The process 100 ends in step 116.

In equivalence, the present invention may also adjust the confidence score according to the environmental parameter. For example, an original confidence score is multiplied by a weighting and/or added with a shift value to obtain an adjusted confidence score, and voice control is performed according to whether the adjusted confidence score is larger than the threshold Td. The weighting and/or shift value are/is adjusted according to the environmental parameter. For example, in one embodiment, when a particular environmental parameter falls within a predetermined range, assume that the setting module 14 expectantly increases the threshold Td from a smaller value Td0 to a larger value Td1. Equivalently, in another embodiment with the same effect, when the environmental parameter falls within the predetermined range, the setting module 14 keeps the threshold Td at the value Td0, and multiplies the original confidence score by a weighting smaller than 1 to obtain an adjusted confidence score. For example, the weighting may equal to Td0/Td1. As such, when comparing the relationship between the adjusted confidence score with the original confidence threshold Td (the value Td0), it is equivalently comparing the original confidence score and the adjusted threshold Td (the value Td1). In other words, largely speaking, one concept of the present invention is to adjust at least one of the confidence value according to the environmental parameter and the threshold to adjust the relationship between the two. For example, the confidence value of a particular value is originally smaller than the threshold, and becomes larger than the threshold when the environmental parameter changes. An approach for changing the relationship between the two from "smaller than" to "greater than" may be lowering the threshold when the environmental parameter changes, and/or increasing the confidence score when the environmental parameter changes.

In the embodiment in FIG. 1, the setting module 14 and the recognition module 16 may be implemented by hardware, or be implemented by a processor that executes program codes of software and/or firmware. Regarding the calculation of the confidence score, the present invention may adopt any algorithm that is capable of automatically quantizing the reliability of a speech recognition result. For example, when a speech is recognized as a word/phrase, the confidence score may represent the accuracy probability of the recognition. The confidence score may be estimated according to a posterior probability, predictor feature, and/or utterance verification.

Further, in the embodiment in FIG. 1, when the setting module 14 automatically adjusts the threshold Td according to the environmental parameter reflected by the signal S_context, a reference source S_ref may be referred. For example, the reference source S_ref may be a set of LUT that is pre-stored in the controller 12. The LUT maps different environmental parameters to different thresholds Td, e.g., the LUT in FIG. 2 and/or FIG. 3. When the setting module 14 is to generate the threshold Td according to the environmental parameter, the setting module 14 may look up the LUT according to the environmental parameter to generate the threshold Td. Further, the controller 12 may also receive a user entry to set the LUT of the reference source S_ref. For example, in the example in FIG. 3, the user may set the time range at the left column. Further, the reference source S_ref may include a mapping function or an algorithm that calculates the corresponding threshold Td from the environmental parameter. In step 106 of the process 100 (FIG. 4), to set the threshold Td according to the environmental parameter, the threshold Td may be mapped and obtained from the environmental parameter according to the reference source S_ref. As shown in FIG. 1, the controller 12 may include (or externally connect to) a storage unit 19. The storage unit 19 may be a volatile or non-volatile memory for storing the reference source S_ref.

Compared to known technologies, the present invention is capable of dynamically adjusting the confidence threshold of speech recognition according to the environmental parameter. As such, speech recognition is enabled to adapt to an operation environment of the voice-controlled device to enhance performance and adaptivity of voice control.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A controller for a voice-controlled device, comprising:
an environment detector, configured to detect an environment to obtain an environmental parameter associated with a volume value;
a setting module, configured to set a threshold according to the environmental parameter, wherein the setting module sets the threshold to a higher threshold when the volume value is higher and sets the threshold to a lower threshold when the volume value is lower; and
a recognition module, configured to receive a speech, to perform speech recognition on the speech to generate a confidence score of speech recognition, and to compare the confidence score of speech recognition with the threshold to generate a control signal.

2. The controller according to claim 1, wherein the environmental parameter is a volume value.

3. The controller according to claim 1, further comprising an environment detector configured to detect the environment to obtain the environmental parameter.

4. The controller according to claim 3, wherein the environment detector is configured to detect a volume of the environment.

5. The controller according to claim 1, wherein the controller comprises a storage unit, the storage unit is configured to store a look-up table (LUT), and the setting module looks up the LUT according to the environmental parameter to generate the threshold.

6. The controller according to claim 1, wherein the environmental parameter is a volume value of a speaker of the voice-controlled device which is controlled by a user.

7. A method for a voice-controlled device, comprising:
detecting, with an environment detector, an environment to obtain an environmental parameter associated with a volume value;
setting, with a setting module, a threshold according the environmental parameter, wherein the threshold is set to a higher threshold when the volume value is higher and the threshold is set to a lower threshold when the volume value is lower;
receiving a speech, and performing speech recognition on the speech to generate a confidence score of speech recognition; and
comparing the confidence score of speech recognition with the threshold to generate a control signal.

8. The method according to claim 7, wherein the environmental parameter is a volume value of a speaker of the voice-controlled device which is controlled by a user.

9. The method according to claim 7, wherein the environmental parameter is a volume value.

10. The method according to claim 7, wherein the environmental parameter is obtained by detecting a volume of the environment.

11. The method according to claim 7, wherein the step of generating the threshold according to the environmental parameter comprises:
looking up an LUT according to the environmental parameter to generate the threshold.

* * * * *